Feb. 15, 1938.   R. J. TEETOR   2,108,151
CLAMP
Filed Aug. 17, 1934   2 Sheets-Sheet 2
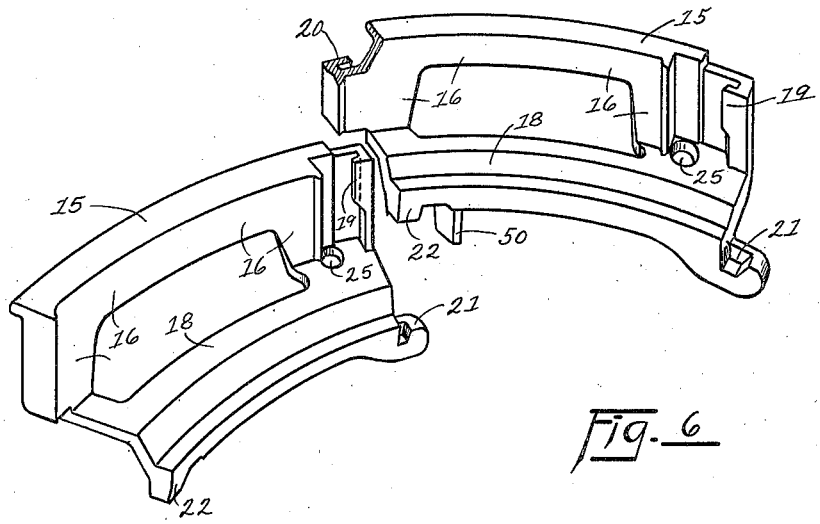
Fig. 6
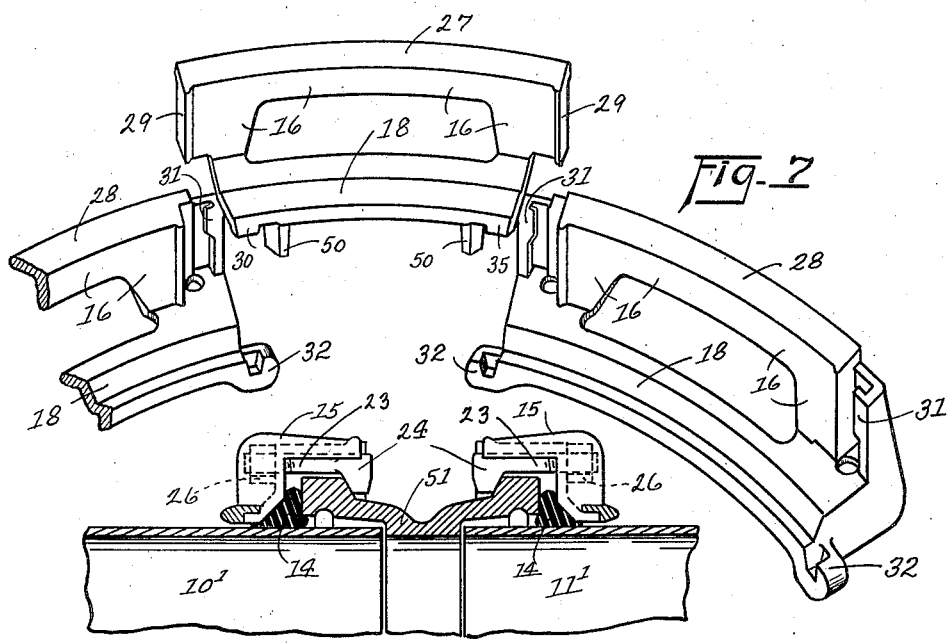
Fig. 7
Fig. 8
Witness:
Geo L. Chapel
Inventor
Ralph J. Teetor
By Rice and Rice
Attorneys Patented Feb. 15, 1938

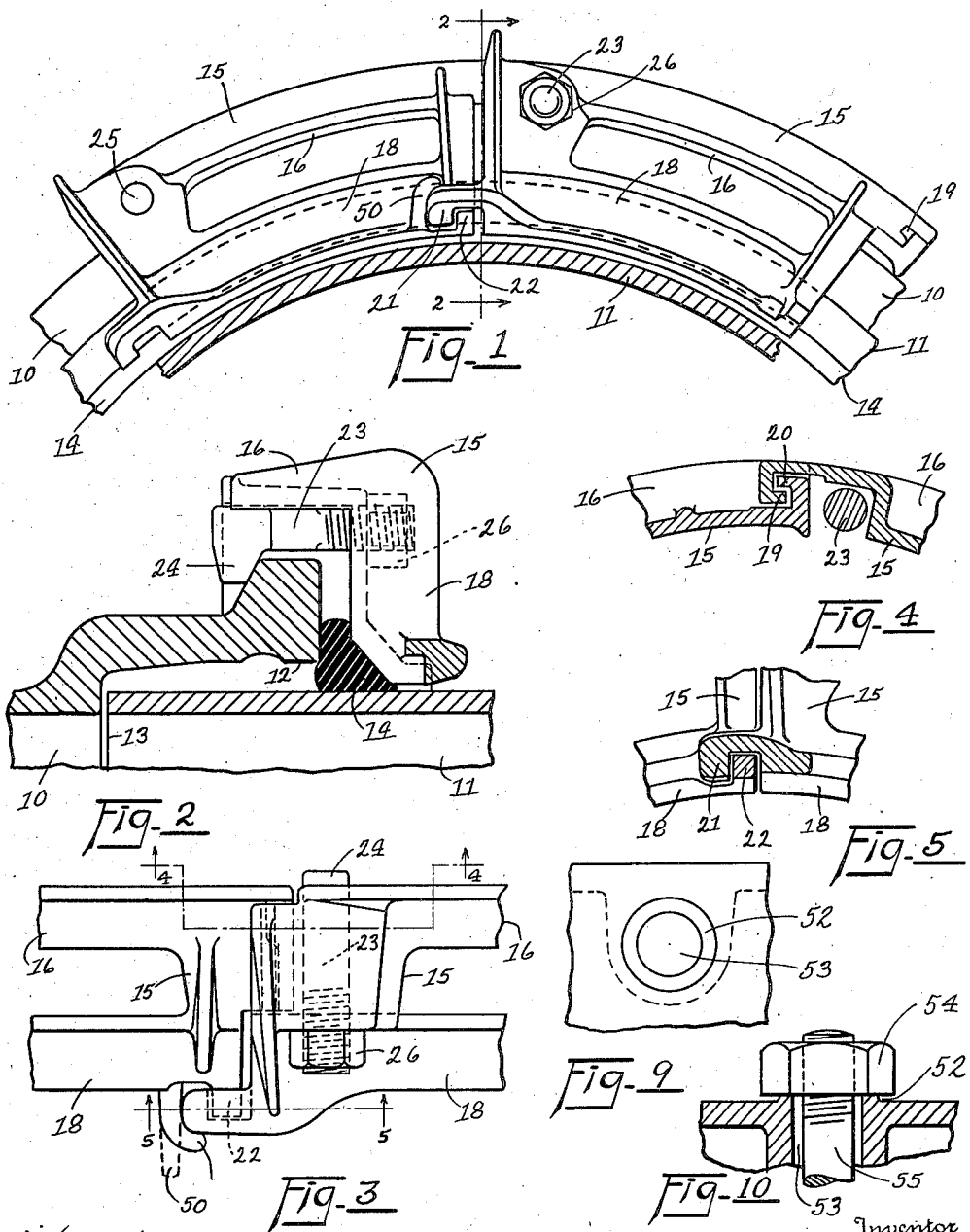

2,108,151

UNITED STATES PATENT OFFICE 2,108,151

CLAMP

Ralph J. Teetor, Cadillac, Mich.

Application August 17, 1934, Serial No. 740,251

3 Claims. (Cl. 285—119)

The present invention relates to clamps and more particularly to clamps for sealing pipe lengths having plain or bell and spigot connecting ends against leakage at their joints.

The principal objects of the invention are to provide a clamp of the character above indicated assembled from a plurality of segmental links or arcuate sections; to provide such a clamp whose segmental links or arcuate sections are interlockingly and detachably secured together; to provide such a clamp whose segmental links or arcuate sections are secured together without the use of bolts or the like; and, to provide a clamp of the character above indicated which is particularly adapted for use in re-sealing old pipe lengths whose joints have been found to be leaking and/or for sealing the joints of new pipe lengths.

Illustrative embodiments of the invention are shown in the accompanying drawings, in which:

Figure 1 is a plan view of one form of a pair of identically formed segmental links or arcuate sections of the clamp, here shown in interlocked detachably secured relation and embracing the packing ring disposed adjacent two lengths of bell and spigot end connected pipes;

Figure 2 is a sectional view thereof on line 2—2 of Figure 1;

Figure 3 is a fragmentary elevational view of two of the interlocked segmental links or arcuate sections turned forwardly from the position shown in Figure 1;

Figure 4 is a sectional view on line 4—4 of Figure 3;

Figure 5 is a sectional view on line 5—5 of Figure 3;

Figure 6 is a perspective view of the reverse side of a pair of the identically formed segmental links or arcuate sections showing the manner in which they may be interlockingly detachably secured together;

Figure 7 is a perspective view of a modified form of the clamp in which each alternate segmental link or arcuate section is identically formed at each of its interlocking ends;

Figure 8 is a view showing the manner in which two plain end pipes may be sealed by providing a double bell end coupling member;

Figure 9 is a fragmentary top plan view of a portion of a clamp cast from malleable iron, and showing a bolt receiving aperture provided with an integrally formed upstanding annular collar whose face when compressed under tension of the nut on its screw threaded bolt flattens out to form a better seat for the nut; and Figure 10 is a fragmenary sectional view of the modified construction shown in Figure 9 with the nut engaging the annular collar.

Referring now to the drawings, and particularly to Figures 1 to 6, inclusive, in which like parts of the structure shown are designated by the same numerals in the several views, two lengths of pipe 10, 11 are here shown as having bell and spigot connecting ends 12, 13 respectively and a resilient packing ring 14 of rubber or the like disposed adjacent the connecting ends of the pipe lengths.

A plurality of identically formed segmental links or arcuate sections, preferably cast from malleable iron and generally designated 15, have a portion 16 adapted to embracingly contact the peripheral surface of the bell end of the pipe length 10 and have a flanged portion 18 adapted to overhang the bell end of the pipe length 10 and to engage the resilient packing ring 14.

The portion 16 of each segmental link or arcuate section at one end thereof is provided with a forwardly turned hooked portion 19 and at its other end is provided with a rearwardly hooked portion 20 as best shown in Figures 4 and 6 and the flanged portion 18 of each segmental link or arcuate section at one end thereof is provided with an upwardly turned hooked portion 21 and at its other end is provided with a downwardly turned hooked portion 22 as best shown in Figures 5 and 6. The several segmental links or arcuate sections may thus be detachably interlocked together as best shown in Figure 6, the portion 16 embracingly contacting the peripheral surface of the bell end of the pipe length 10 and the flanged portion 18 overhanging the bell end of this pipe and in engagement with the resilient packing ring 14. The flanged portion 18 may likewise be provided with a lug 50 spaced from the hooked portion 22 and which is adapted to be bent over the hooked portion 21 for better maintaining the segmental links or arcuate sections in secured relation both during shipment and in use, as best shown in Figure 3.

Tightening means for effecting pressure on the packing ring to seal the pipe joint between the two lengths of pipe is here shown as comprising a bolt 23 having an offset head 24 engaging the inner side of the bell end of the pipe, and passing through the bolt aperture 25 in each segmental link. By tightening the nut 26, the bolt passing through each segmental link or arcuate section causes the flanged portion of each link or section to tensionally engage and effect pressure against the packing ring 14 whereby the pipe joints between the several lengths of pipe may be effectively sealed.

In the modified construction shown in Figure 7, each alternate segmental link or arcuate section 27, 28 has identically formed hooked portions 29, 30 and 31, 32 respectively, permitting detachable interlocking assembly of the alternately identically formed segmental links or arcuate sections. In instances where it is desired to seal plain end pipes against leakage at their joints, a double bell end coupling 51 such as is shown in Figure 8 may be used. This coupling is, of course, a "pipe length" within the meaning of the appended claims since it is in fact a short pipe having double bell ends.

In the structure shown in Figures 9 and 10, the clamp is formed of malleable iron. Any portion of such clamp as requires a bolt receiving aperture is preferably provided with an integrally formed upstanding annular rib 52 circumscribing the aperture 53 and whose face is flattened by pressure of the nut 54 on its bolt 55 to thereby form a better seat for the nut.

It will thus be seen that a clamp formed of a plurality of interlocking and detachably secured segmental links or arcuate sections has been herein shown and described which is particularly well adapted for use in sealing joints of both plain and bell and spigot end connected pipes and that such segmental links or arcuate sections may be secured together in interlocking detachable assembly without the use of bolts or other independent fastening means.

While but several embodiments of this invention have been herein shown and described, it will be understood that numerous details of the constructions shown may be altered or omitted without departing from the spirit of this invention as defined by the following claims.

I claim:

1. A clamp for sealing pipe lengths having bell and spigot connecting ends against leakage at their joints comprising a plurality of segmental links, one end of each link having a hooked portion and the other end of each having a reversely hooked portion adapting the several links to be detachably interlocked together and each of said links having a flanged portion adapted to overhang the bell end portion of a pipe length and to engage a packing ring disposed adjacent the connecting ends of the pipe lengths, and tightening means operatively associated with the links adapted to tensionally engage against the bell end portion of the pipe length for effecting pressure on the packing ring to seal the pipe joint between the two lengths of pipe.

2. A clamp for sealing pipe lengths having bell and spigot connecting ends against leakage at their joints comprising a plurality of segmental links, the ends of the segmental links having co-operatingly loosely engaging hooked portions for detachably and flexibly interlocking the links together as a series around a pipe independent of pipe connecting means and each of said links having a continuous flanged portion adapted to overhang the bell end portion of a pipe length and to engage a packing ring disposed adjacent the connecting ends of the pipe lengths, and tightening means operatively associated with the links adapted to spacedly tensionally engage against the bell end portion of the pipe length for effecting pressure on the packing ring to seal the pipe joint between the two lengths of pipe.

3. A clamp for compressing a sealing ring against the bell of a bell and spigot pipe joint, comprising a plurality of segmental links, relatively engaging means at the ends of said links for supporting the several links in an annular series around a spigot end of a pipe in opposing relation to a bell prior to, and independent of, connection of the clamp with a section of the pipe, tightening means adjustably associated with the said links and operatively engageable with a bell of the pipe to forcibly press a sealing ring between the clamp and said bell, and bendable means carried by the links to interlock the end means thereof in engaged relation independent of the said tightening means.

RALPH J. TEETOR.